United States Patent
Tumuluru

(10) Patent No.: US 11,115,854 B2
(45) Date of Patent: Sep. 7, 2021

(54) ADJUSTING BANDWIDTH UTILIZATION OF WIRELESS NETWORK BASED ON POTENTIAL ISSUES BEING PREDICTED

(71) Applicant: ARRIS Enterprises LLC, Suwanee, GA (US)

(72) Inventor: Sundar Murthy Tumuluru, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 16/228,755

(22) Filed: Dec. 20, 2018

(65) Prior Publication Data

US 2020/0205022 A1    Jun. 25, 2020

(51) Int. Cl.
*H04W 24/08* (2009.01)
*H04W 28/22* (2009.01)
*H04W 28/02* (2009.01)
*H04W 48/06* (2009.01)
*H04W 28/10* (2009.01)
*H04W 28/20* (2009.01)

(52) U.S. Cl.
CPC ....... *H04W 28/0236* (2013.01); *H04W 24/08* (2013.01); *H04W 28/0247* (2013.01); *H04W 28/0289* (2013.01); *H04W 28/10* (2013.01); *H04W 28/20* (2013.01); *H04W 28/22* (2013.01); *H04W 48/06* (2013.01)

(58) Field of Classification Search
CPC .............................. H04W 24/08; H04W 28/10
See application file for complete search history.

(56) References Cited

U.S. PATENT DOCUMENTS

| | | | |
|---|---|---|---|
| 9,693,277 B2 | 6/2017 | Ponnuswamy | |
| 2008/0117875 A1 | 5/2008 | Bennett et al. | |
| 2013/0090116 A1* | 4/2013 | Lim | H04W 36/0083 455/434 |
| 2015/0173103 A1* | 6/2015 | Lunden | H04L 67/1097 370/331 |
| 2018/0077720 A1* | 3/2018 | Wang | H04W 72/1247 |

\* cited by examiner

*Primary Examiner* — Angel T Brockman
(74) *Attorney, Agent, or Firm* — Wenderoth, Lind & Ponack, L.L.P.

(57) ABSTRACT

Monitoring activities of wireless devices connected to a wireless network (e.g., when connected and to what access points, what activities, bandwidth utilized). Processing monitored activities to develop trends for wireless devices (e.g., likely time for connecting to which access points, likely activities performed, likely bandwidth usage, likely movement patterns). Predicting potential issues with the wireless network based on current network activities and predicted activities based on the developed trends. The potential issues may include congestion of an access point. Taking actions, including modifying activities of one or more wireless devices, to avoid the potential issues, reduce impact of the potential issues and/or prevent any performance degradation to high priority wireless devices. The activity modifications may include, for example, restricting/changing access point connectivity, limiting/modifying functions performed, modifying bit rate, changing frequency band, and delaying/restricting activities. Parameters associated with wireless devices may be identified, including identifying high priority wireless devices.

20 Claims, 9 Drawing Sheets

ADJUSTING BANDWIDTH UTILIZATION OF WIRELESS NETWORK BASED ON POTENTIAL ISSUES BEING PREDICTED

BACKGROUND

More and more devices are capable of communicating wirelessly. The wireless communications may be between wireless devices and/or with the Internet. The wireless communications between wireless devices may be accomplished using one or more wireless protocols. For example, wireless devices may communicate directly with one another using Bluetooth (IEEE 802.15.1). Alternatively, wireless devices may communicate with each other or with the Internet via a wireless local area network, such as WiFi (IEEE 802.11). To communicate via a WiFi network, the WiFi devices may directly connect to the WiFi network via an access point (e.g., router). Bluetooth devices may connect to the WiFi network utilizing a Bluetooth-WiFi bridge.

The wireless devices (Bluetooth and/or WiFi) include devices that typically remain in same location (stationary devices) and devices that are typically changing locations with a user (mobile devices). The stationary devices may include, but are not limited to, televisions, appliances, entertainment systems, door locks, and security cameras. The mobile devices may include, but are not limited to, computers, tablets, phones, watches (e.g., Apple Watch®), activity trackers (e.g., Fitbit®), electronic-readers (e.g., Kindle®), remote controls, headphones, toys and remote starters.

With the increase in the number and type of wireless devices that are in use every day comes a need for an increase in performance (e.g., speed, bandwidth, range) of wireless (e.g., WiFi) networks. Increased speed may be necessary to handle the increasing capabilities of many of these devices, such as ultra-high definition video. Increased bandwidth may be required to handle the increased number of devices that are likely accessing the WiFi network. Increased range is required as the wireless devices are likely located at varying distances from an access point for the WiFi network so the WiFi network needs to be able to communicate further distances.

Higher speed WiFi networks such as those operating at 5 GHz (5G networks) have been deployed. However, many WiFi devices are still designed for lower speed networks such as those operating at 2.4 GHz (2.4G networks). Accordingly, it is often the case where WiFi networks are designed to operate at multiple frequencies (e.g., 2.4G and 5G). A WiFi network may include a modem/gateway to connect to a broadband network (e.g., cable network, telco network, satellite network) provided by a service provider and a WiFi router to provide a WiFi access point to the broadband network. The WiFi router may include multiple antennas (e.g., 2.4G and 5G) so they can operate at multiple frequencies. The modem/gateway and WiFi router may be combined in a single device (main access point).

Furthermore, the WiFi network may utilize WiFi network extenders in order to expand the bandwidth and range of the WiFi networks to areas that may not be capable of receiving a WiFi signal from the main access point. The network extenders may provide the ability to connect to one or more of the WiFi networks (e.g., 2.4G, 5G) provided by the main access point by transmitting the WiFi signal from the location of the network extender. The network extenders may communicate with the main access point via a wired (e.g., home electrical wiring, coaxial cable, Ethernet cable) connection or a WiFi connection.

FIG. 1 illustrates an example high level system diagram of a WiFi network 100 within a location. The WiFi network 100 may include a gateway/modem 110, a WiFi router 120 and one or more network extenders 130. The gateway/modem 110 is for communicating with a broadband network 140. The WiFi router 120 is connected to the gateway/modem 110 to provide a link between the WiFi network 100 and the broadband network 140. The WiFi router 120 may include one or more antennas to transmit and receive WiFi signals to enable communications with wireless devices 150. As the WiFi router 120 may not be capable of communicating with wireless devices 150 that are too far away, the network extenders 130 may be located at points remote from the WiFi router 120 to provide for additional WiFi communications with additional wireless devices 150. The network extenders 130 may provide a subset or all of the frequency bands of the WiFi router 120.

The location of the router 120 should be in close proximity to the gateway/modem 110. According to one embodiment, the gateway/modem 110 and the router 120 may be combined into a single component. The gateway/modem 110 and the router 120 may be located in a central part of the location and/or an area where most wireless traffic is expected. For example, the gateway/modem 110 and the router 120 may be located on the main floor in a residence or may be located in a home office. The extenders 130 may be located at locations that the WiFi signal from the router 120 may not be strong, where sufficient WiFi traffic is expected, or where a quality WiFi signal is desired/required. For example, an extender 130 may be located on different floors from the router 120 or in a home office or an entertainment room where connectivity is important.

The wireless devices 150 connected to the router 120 or extenders 130 may be stationary devices (indicated as solid lines) or may be mobile devices (indicated by dashed lines). The wireless devices 150 may be connected to the access point (e.g., router 120, extender 130) that has the strongest signal strength. As illustrated, the router 120 is connected to three wireless devices 150 of which two are stationary and one is mobile, a first extender 130 (network extender 1) is connected to two wireless devices 150 of which both are mobile, and a second extender 130 (network extender 2) is connected to two wireless devices 150 of which one is stationary and one is mobile. The configuration of the wireless network 100 is not limited to any specific location for the router 120, any number or location of the extenders 130, any number of wireless devices being connected to the WiFi network or any wireless device connection topology. In fact, the number and access point connectivity configuration of the wireless devices 150 may vary over time as the wireless devices move within the location.

The WiFi network 100 may be configured in such a fashion that the router 120 and the extenders 130 have the same service set identifier (SSID) and password so that once a wireless device 150 connects to the network 100 via any access point it can be connected the network 100 via any other access point without having to select another SSID or enter another password. Certain access points or frequency bands may get congested based on the number of wireless devices 150 connected thereto and the activities being performed thereon.

SUMMARY

A method for using trends to predict potential issues and take actions to avoid the potential issues or limit impact thereof. The method includes monitoring activities of wireless devices connected to the wireless network. The monitored activities are processed to develop trends for the wireless devices. Potential issues with the wireless network are predicted based on current network activities and predicted activities based on the developed trends. Actions are taken to avoid the potential issues or reduce impact of the potential issues.

A device for using trends to predict potential issues and take actions to avoid the potential issues or limit impact thereof. The device includes a wireless interface to communicate with one or more wireless devices. A processor communicatively coupled to a memory for storing network configuration information, wherein the network configuration information includes network topology and wireless device parameters. A computer-readable storage medium to store instructions that when executed by the processor cause the processor to monitor activities of wireless devices connected to the wireless network. The monitored activities are processed to develop trends for the wireless devices. Predicting potential issues with the wireless network based on current network activities and predicted activities based on the developed trends. Taking actions to avoid the potential issues or reduce impact of the potential issues.

A non-transitory computer-readable storage medium containing stored instructions that when executed by a processor cause the processor to use trends to predict potential issues and take actions to avoid the potential issues or limit impact thereof by monitoring activities of wireless devices connected to the wireless network. The monitored activities are processed to develop trends for the wireless devices. Predicting potential issues with the wireless network based on current network activities and predicted activities based on the developed trends. Taking actions to avoid the potential issues or reduce impact of the potential issues.

BRIEF DESCRIPTION OF THE DRAWINGS

Various features of the embodiments described in the following detailed description can be more fully appreciated when considered with reference to the accompanying figures, wherein the same numbers refer to the same elements.

DETAILED DESCRIPTION

Multiple wireless devices may connect to a WiFi network within a location (e.g., residence, business). The wireless devices may include stationary devices (e.g., televisions, appliances, entertainment systems, door locks, security cameras) and mobile devices (e.g., computers, tablets, phones, watches, activity trackers, e-readers). The mobile devices may move around the location and be connected to various access points within the location over time. Devices may connect and disconnect to the network over time. The connecting and disconnecting of the mobile devices may be based on, for example, the devices entering and leaving the location the WiFi network is located in, the devices being in and out of range of the WiFi network and/or the devices being powered on or off. The number, type, and specific devices connected to the network may change over time.

Over the course of time, the number of wireless devices connected to a specific access point may reach a point where performance is affected (the access point is congested). The performance may be affected in various manners including, but not limited to, the slowing of the wireless connection, one or more wireless devices being bumped from the access point, one or more wireless devices being transferred to another access point that may not be preferred, and/or a sudden change in the bit rate of an adaptive bit rate stream being provided to one or more of the devices. The loss or disturbance of connectivity, the reduction in bandwidth and/or the reduction in bit rate may be noticeable to the users and provide the users with a bad experience.

Figure 1:
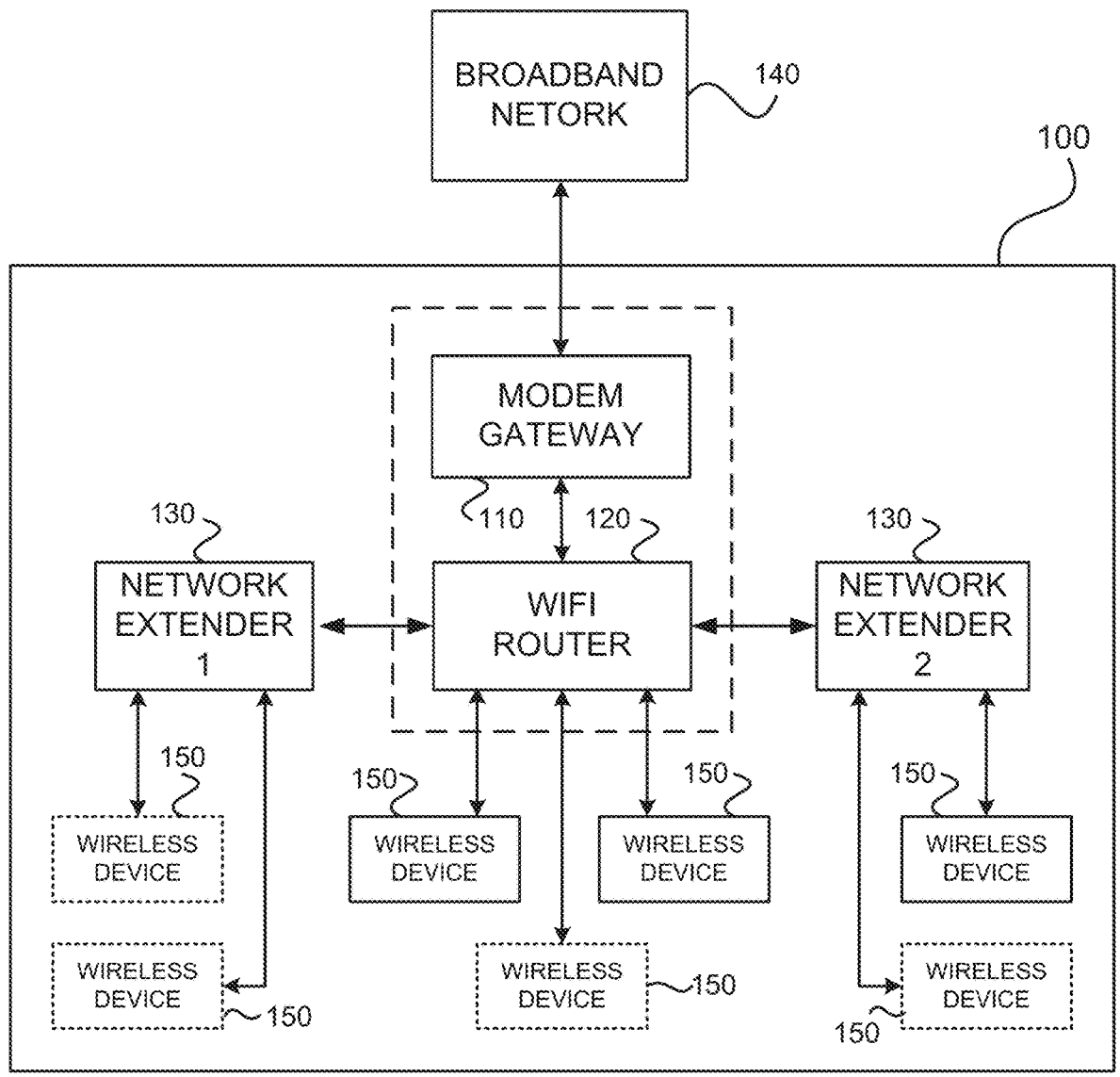
FIG. 1 illustrates an example high level system diagram of a WiFi network within a location.
Figure 2A:
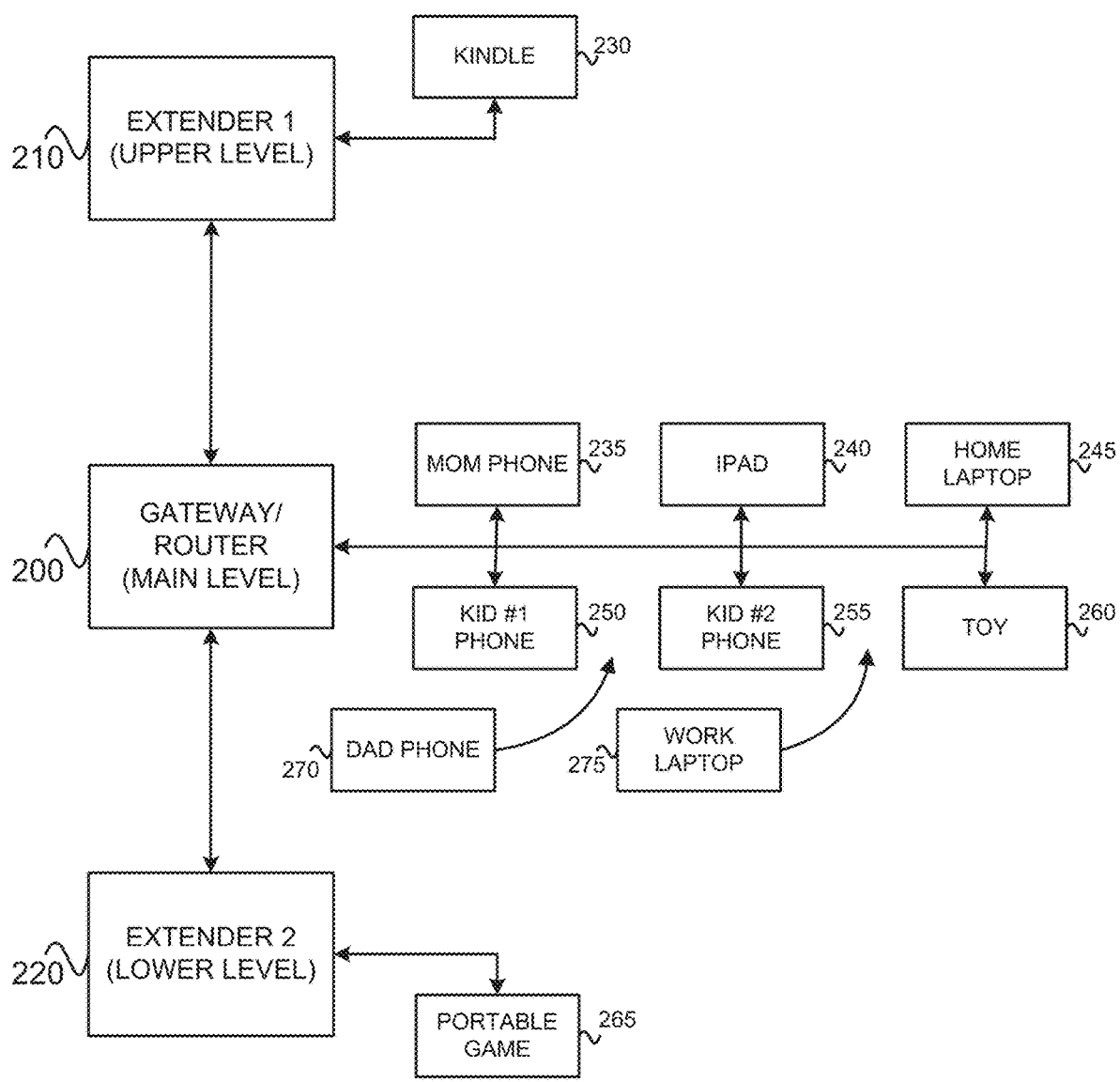
FIGS. 2A-C illustrate examples of access points on a WiFi network becoming congested, according to one embodiment.
Figure 2B:
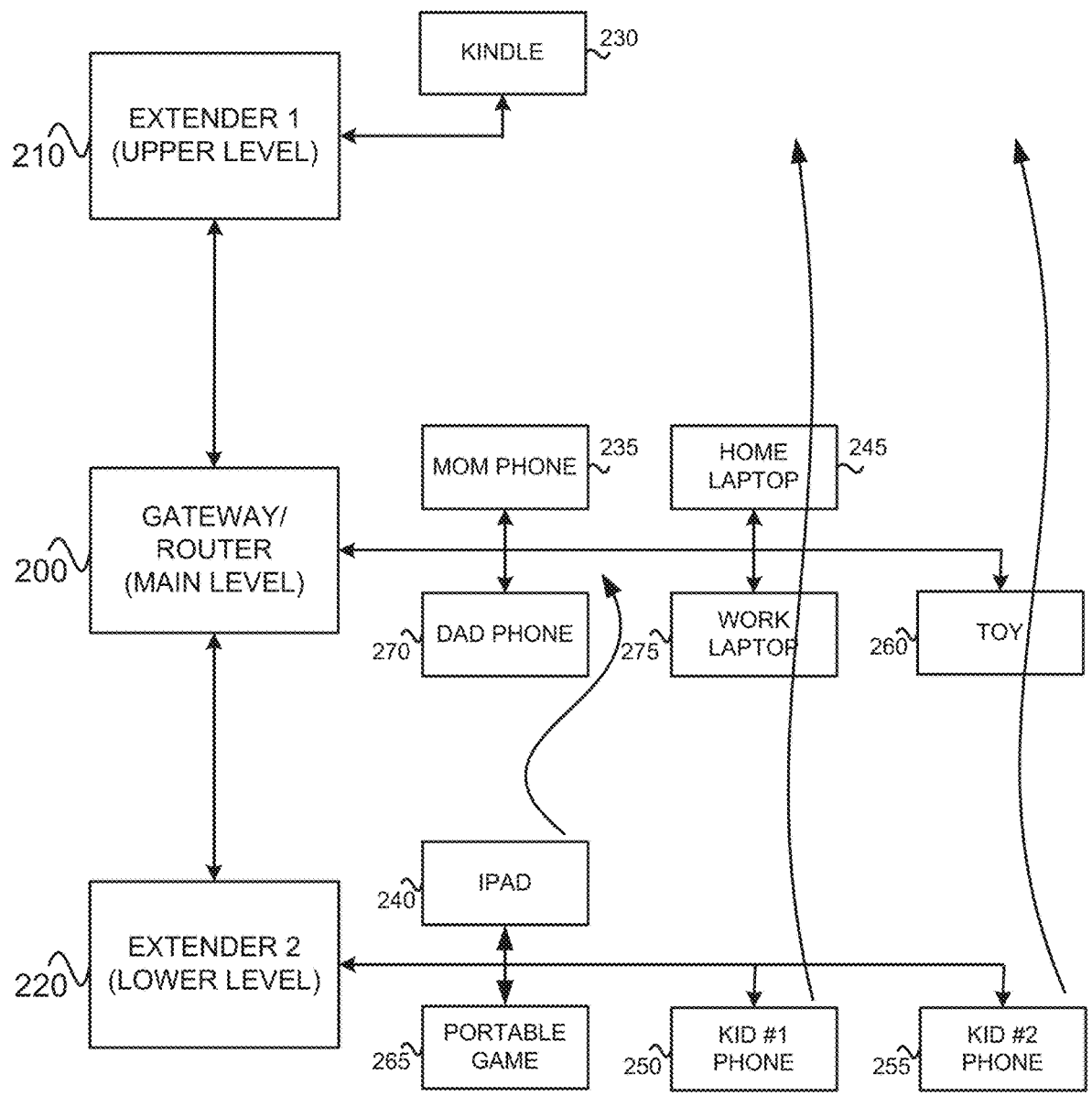
Figure 2C:
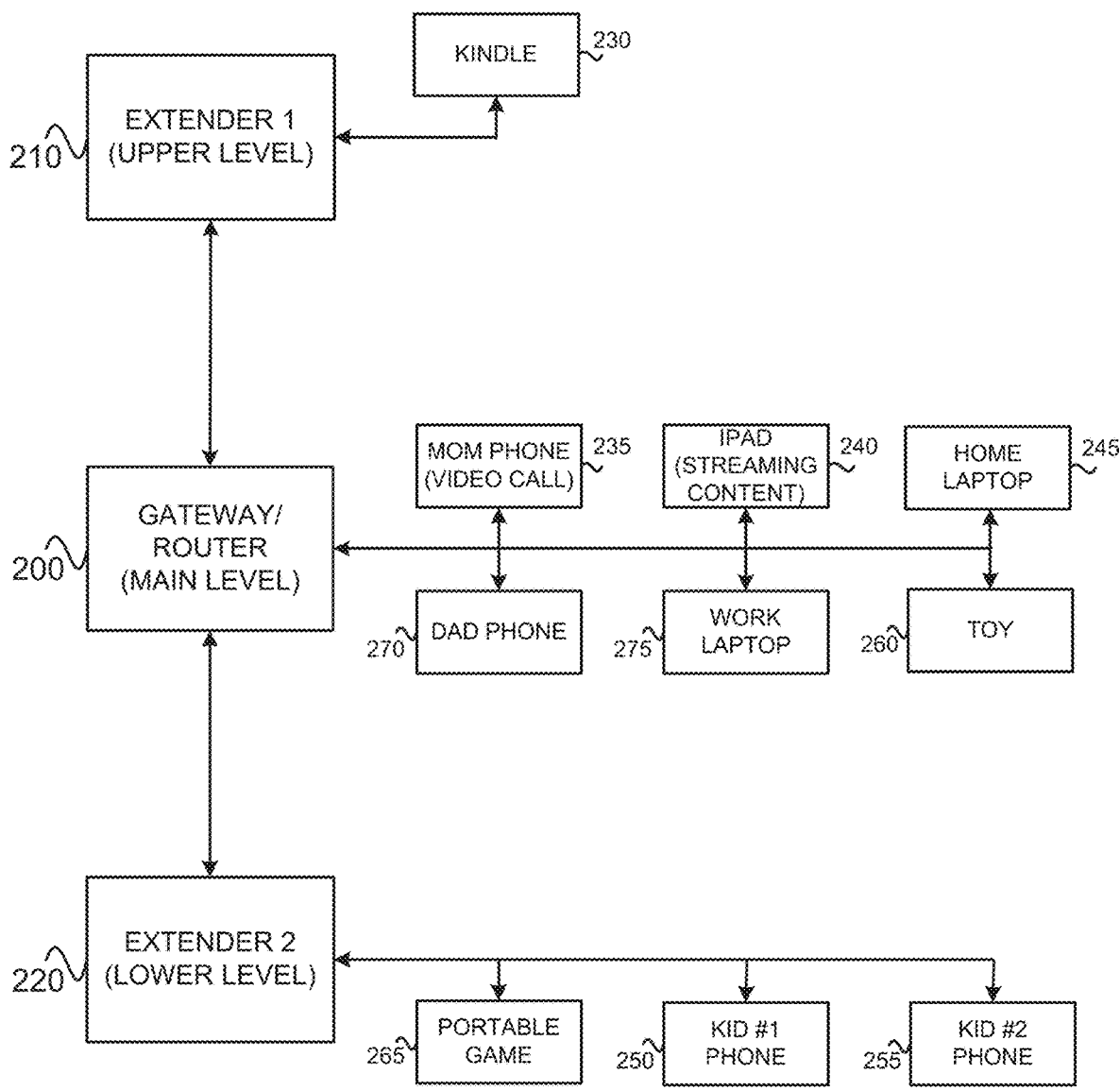

FIGS. 2A-C illustrate examples of access points on a WiFi network becoming congested. The example WiFi network of FIGS. 2A-C includes a gateway/router (main access point) 200, a first network extender 210 and a second network extender 220. As illustrated, the gateway/router 200 is located on a main level (e.g., kitchen, family room, office), the first network extender 210 is located on an upper level (e.g., bedrooms) and a second network extender 220 is located on a lower level (e.g., basement, game room). The configuration of the WiFi network is not limited to any specific number of network extenders and/or location of any of the access points (gateway/router 200, network extenders 210, 220). For example, the network extenders 210, 220 could be associated with specific rooms in the location rather than floors.

It should be noted that the access points and the wireless devices connected thereto may be identified by assigned names that are easy to remember. For example, the access points may be identified by location (e.g., main floor, master bedroom, basement, office) and the wireless devices may be identified by user name and device type (e.g., dad's phone, work laptop, Bob's Kindle®).

FIG. 2A illustrates an example where an addition of several wireless devices to the WiFi network may cause congestion. As illustrated, a Kindle® 230 is connected to the first network extender 210, mom's phone 235, an iPad® 240, a home laptop 245, a first kid's phone 250, a second kid's phone 255, and a toy 260 are connected to the gateway/router 200 and a portable game 265 is connected to the second network extender 220. When a dad comes home, the dad's phone 270 and the work laptop 275 attempt to connect to the network via the gateway/router 200.

The addition of these two devices 270, 275 to the gateway/router 200 may cause the gateway/router 200 to become congested and may cause performance issues with some of the devices previously connected thereto 235-260 and/or those devices attempting to connect thereto 270-275. The performance issues may include a reduction in the speed of one or more of the devices 235-260, 270, 275 and/or an abrupt reduction in the bit rate for adaptive bit rate streaming for one or more of the devices 235-260, 270, 275. The wireless network may attempt to address the congestion issues in various manners including dropping one or more of the currently connected wireless devices 235-260 from the gateway/router 200, not allowing one or more of the attempting to connect devices 270-275 to connect to the gateway/router 200, rerouting one or more currently connected devices 235-260 or attempting to connect devices 270-275 to a different access point (e.g., 210, 220) that may not be a preferred access point (e.g., 200).

FIG. 2B illustrates an example where movement of several wireless devices connected to the WiFi network may cause congestion. As illustrated, the Kindle® 230 is connected to the first network extender 210, mom's phone 235, the home laptop 245, dad's phone 270, the work laptop 275 and the toy 260 are connected to the gateway/router 200 and the iPad® 240, the portable game 265, the first kid's phone 250 and the second kid's phone 255 are connected to the second network extender 220. At a certain point, the iPad® 240 may be moved from the lower level to the main level which may cause the connection to the WiFi network to transition from the second network extender 220 to the gateway/router 200 and the kid's phones 250, 255 may be moved from the lower level to the upper level which may cause the connection to the WiFi network to transition from the second network extender 220 to the first network extender 210 via the gateway/router 200. That is, the first network extender 210 is a leaf node and can only hand off wireless devices to the gateway/router 200 (it cannot hand off wireless devices directly to the second network extender 220).

The addition of the phones 250, 255 (temporarily as they transition to the second network extender 220) and the iPad® 240 to the gateway/router 200 may cause the gateway/router 200 to become congested and may cause performance issues with some of the devices previously connected thereto 235, 245, 260, 270, 275 and/or those devices attempting to connect thereto 240, 250, 255 (even if temporarily). The wireless network may attempt to address the congestion issues in various manners, but not all of the manners may be beneficial.

FIG. 2C illustrates an example where changes in what actions the wireless devices are performing may cause congestion. As illustrated, the Kindle® 230 is connected to the first network extender 210, the mom's phone 235, the iPad® 240, the home laptop 245, the dad's phone 270, the work laptop 275, and the toy 260 are connected to the gateway/router 200 and the portable game 265, the first kid's phone 250 and the second kid's phone 255 are connected to the second network extender 220. At a certain point the mom's phone 235 may engage in a video call and the iPad® 240 may engage in streaming content.

The increase in the activity of the mom's phone 235 and the iPad® 240 may cause the gateway/router 200 to become congested and may cause performance issues with some of the devices connected thereto 235, 240, 245, 260, 270, 275. The wireless network may attempt to address the congestion issues in various manners, but not all of the manners may be beneficial.

While the loss of performance on any wireless device may not be desirable, the loss of performance on certain wireless devices may not be tolerable. For example, performance loss may be acceptable on a child's cell phone or gaming system but may not be tolerable on a work computer, a work phone or a student computer. According to one embodiment, in addition to setting up and configuring the network (e.g., number of access points, location of access points, naming access points, selecting passwords, naming devices), the WiFi network may have different parameters defined that may assist in the operation thereof. These parameters may define what to do in the event of congestion or how to avoid congestion so that the service impact is minimized. The parameters may be related to the access points in the network as well as the devices that may connect to the network. For example, the parameters may include, but are not limited to, network topology, layout of location the WiFi network is located at, relationship between network topology and location layout, station connectivity for the access points (e.g., is the access point a leaf node where it can only transition devices with one other access point), priority levels for the wireless devices, preferred access points in the network for the devices, priority activities for the wireless devices, types of activities the wireless devices may partake in, time frames when the wireless devices may be connected to the network and locations where devices may be within the location.

The configuration of the WiFi network and the defining one or more parameters may be done by a user and/or administrator thereof. The user/administrator may configure the WiFi network and define the one or more parameters using an app running on a smart phone and/or tablet or may use any computing device to logon to a website. The app and/or website may be associated with the broadband network service provider, often referred to as Internet service provider (ISP) or simply service provider. The user interface may define the WiFi network configuration and network/device parameters in an access point for the network, such as the main access point. The main access point may be the WiFi router 120 that is connected to the modem/gateway 110 or is possibly part of a combined gateway/router.

According to one embodiment, the access point for the WiFi network may track different activities about the network and the devices connected thereto and may process those activities to define trends thereabout. The trends may supplement the parameters defined by an administrator or may be additional information not provided by an administrator. For example, the network may determine the most probable time that stations may enter/exit the network, the most probable activities that the stations may partake in (e.g., video, audio, streaming, data) and times associated therewith, bandwidth requirements for the devices and times associated therewith, movement patterns of the devices and times associated therewith, access points the devices are likely to connect to and times associated therewith, and/or probability of devices entering different access points at different times.

The parameters defined about the network and the devices connected thereto and/or the trends generated may be used to control the network so that congestion is avoided if possible and if congestion occurs that appropriate actions are taken so as to avoid service interruption or noticeable service changes (e.g., noticeable changes to video quality), especially to priority devices.

The network configuration, the activity data captured, and/or the parameters (defined/generated) may be stored in the access point (e.g., gateway/router), in a set top box (STB) or any other device having storage that is connected to the wireless network and/or in the cloud (e.g., storage provided to user by ISP).

Figure 3:
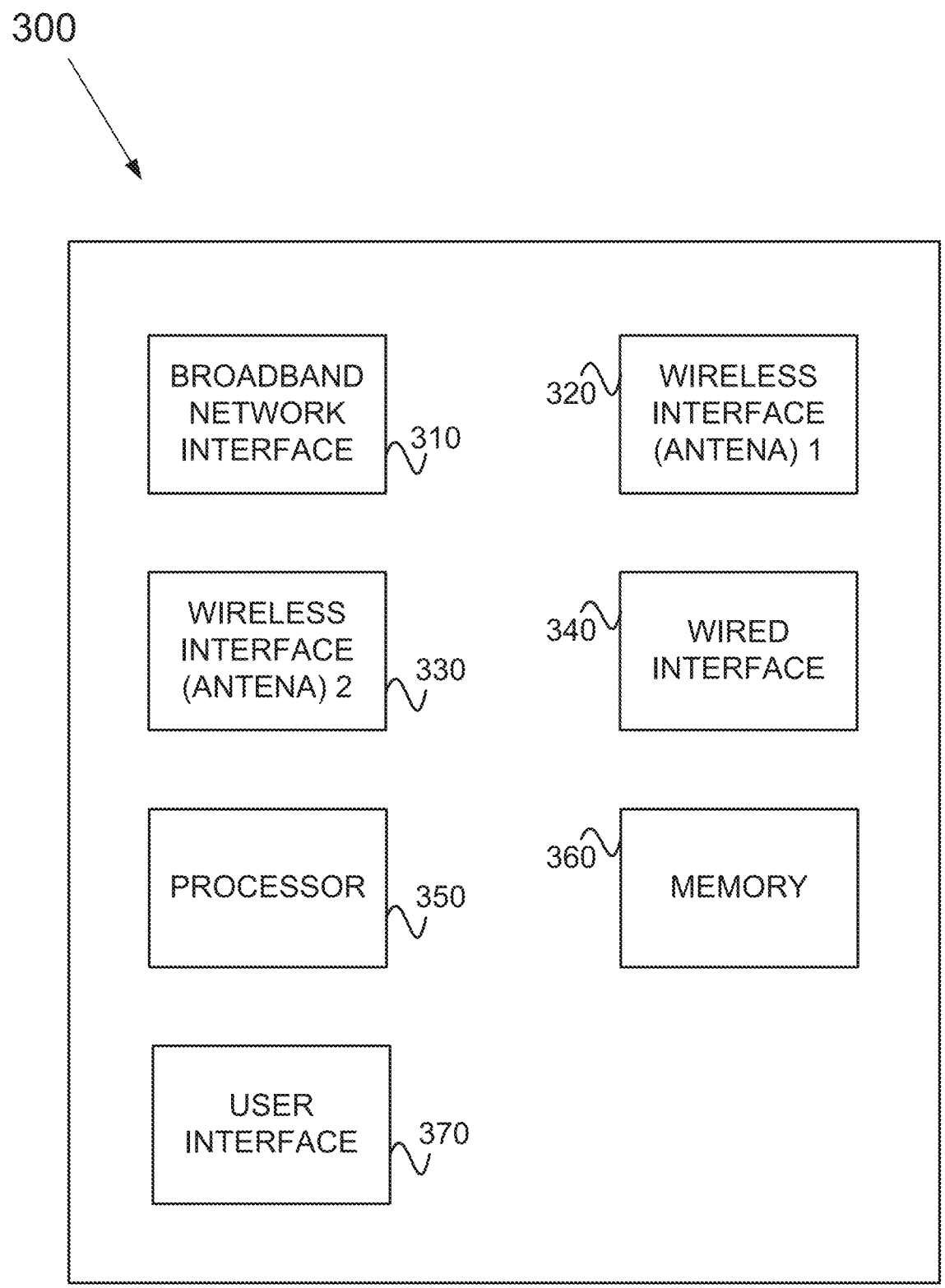
FIG. 3 illustrates an example high level functional diagram of an access point, such as a gateway/router for a WiFi network, according to one embodiment.

FIG. 3 illustrates an example high level functional diagram of an access point, such as a gateway/router 300 for the WiFi network. The gateway/router 300 may include a broadband network interface 310, a first WiFi interface (antenna) 320, a second WiFi interface (antenna) 330, a wired interface 340, a processor 350, memory 360 and a user interface 370. Network extenders may have similar functional diagrams, but likely do not include the broadband network interface 310. In addition, some network extenders may not include multiple WiFi interfaces but rather may be limited to operating at a single WiFi frequency.

The broadband network interface 310 is to provide connectivity to and communications with a broadband network 140. The network interface 310 may include a connector, for example, a coaxial connector for receiving a coaxial cable and associated protocols for providing the necessary communications with the broadband network 140 (e.g., receiving data from and transmitting data to). The broadband network 140 provides access to external content and external system including the Internet.

The first and second WiFi interfaces (antennas) 320, 330 are to provide WiFi communications between the gateway/router 300 and wireless devices (establish WiFi networks). The first WiFi interface 320 may be to establish a WiFi network operating at a first frequency (e.g., 5 GHz network pursuant to IEEE 802.11a) and the second WiFi interface 330 may be to establish a WiFi network operating at a second frequency (e.g., 2.4 GHz network pursuant to IEEE 802.11b,g). According to one embodiment, it is possible that a single chip includes multiple antennas and can provide communications at different frequencies (e.g., 2.4 and 5 GHz network pursuant to IEEE 802.11n). The wireless devices may utilize the gateway/router 300 to communicate with other wireless devices within the location or may use it as an access point to connect to the Internet via the broadband network 140.

The wired interface 340 is to provide wired communications between the gateway/router 300 and other devices. The other devices may be computing devices using the gateway/router 300 to communicate with wireless devices within the location or access the Internet via the broadband network 140. The other devices may be network extenders that extend the range of the wireless network within the location. The wired interface 340 may include a connector (e.g., coaxial, Ethernet, USB) to receive an appropriate cable and associated protocols for receiving and transmitting data thereover.

The processor 350 is to control the operation of the gateway/router 300. The processor 350 is to execute computer-executable instructions (e.g., software, apps). The computer executable instructions, when executed, may cause the processor 350 to control the operations of the gateway/router 300 and perform various functions including, but not limited to, network configuration, network and device parameter definition, activity monitoring and analysis (e.g., statistics, analytics), device and network trend generation, potential issue prediction, and adjusting network parameters, device connectivity, and/or device operations as required. Some of the functions performed by the processor 350 are based on data that is collected about the network and the devices connected thereto. In addition to controlling the operation of the gateway/router 300, the processor 350 may also control the operation of the network.

The memory 360 is to store the computer-executable instructions and/or other data. The other data may include, for example, configuration data (e.g., wireless network topology), connectivity data (e.g., wireless devices actively connected to the wireless network, signal strength of connected devices, congestion of access points), activity data (e.g., bandwidth utilized by wireless device, tasks being performed) and/or trend data calculated (e.g., when/where the wireless devices will connect, when/what activities the wireless devices will perform). The gateway/router 300 may receive data related to what is connected to the network extenders from the network extenders. The data may be received from the network extenders, for example, when wireless devices connect or disconnect from the network extenders, when the wireless devices communicate with the broadband network 140 which requires communications with the gateway/router 300 and/or at defined intervals (e.g., every few seconds).

The memory 360 may be located on the processor 350 and/or may be separate from the processor 350. The memory 360 storing the computer-executable instructions may be computer-readable memory so that the processor 350 can read and execute the computer-executable instructions.

The memory 360 may be supplemented with external memory that may be located in other access points, in a STB or any other device having storage that is connected to the wireless network and/or in the cloud.

The user interface 370 may include, for example, lights to provide a user an indication about the operational status thereof. The user interface 370 may also include, for example, switches, buttons or the like to enable the user to, for example, power on/off and/or reset the gateway/router 300.

As described above with respect to FIG. 3, the processor 350 may gather/generate the usage, performance, statistics, analytics, trend and/or issue prediction information. Alternatively, at least some subset of the information may be generated by a service provider. The service provider may maintain one or more servers in the cloud that receive the data collected from the gateway/router 300 and process the data to generate the usage, performance, statistics, analytics, trend and/or issue prediction information. The data may be forwarded from the gateway/router 300 at, for example, defined intervals (e.g., every night, once a week), when trouble shooting is required and/or when the user opens the user interface. Alternatively, the server may be capable of retrieving the data from the gateway/router 300 when, for example, they need to troubleshoot the wireless network, recommend changes/upgrades to the wireless network (e.g., to handle problems or optimize performance and/or cost) and/or perform maintenance on the wireless network. According to one embodiment, the information may be generated as a collaboration between the processor 350 and the cloud server for the service provider.

As noted above, the WiFi network may provide for the ability to define priorities for wireless devices that will be connected thereto. The priorities may include various levels, for example, high, medium and low. Each priority level may have defined service levels associated therewith. For example, a high priority device may be defined as a device that should be given priority to all other devices. A high priority device may be such that actions should be taken to ensure that it does not lose connectivity, have processing slowed, or have any impact on a user experience. A low priority device may be defined as a device that can have service interrupted, have processing slowed and have actions taken that may affect the user experience (e.g., quick change in video quality that is visible, change from video call to voice call) in order to preserve service for higher priority devices. A middle priority device may be defined therebetween the high and low priority devices.

The WiFi network (e.g., gateway/router 300) may utilize the priorities for the wireless devices that may connect to the network as well as the parameters that were defined and/or the trends generated about the wireless devices to control the operation of the network so as to provide better performance thereof (act as a network controller). Specifically, the WiFi network may operate so as to provide the best performance possible to the priority devices. The processor 350 may perform these network controller functions.

The priorities and the trends (e.g., when wireless devices will likely enter/exit the network, functions they are likely to perform) may be utilized to predict when the trends applied to current conditions may cause congestion on an access point and therefore potential performance issues. Preemptive actions may be taken to avoid the predicted congestion and/or to make adjustments when congestion happens that have the least affect, specifically the least affect on priority devices. The actions that may be taken include restricting access to an access point, routing devices to other access points, switching devices to different frequencies, gradually adjusting the bit rate of an adaptive bit rate stream, rescheduling background tasks (e.g., uploading or downloading content), and/or lowering service levels (e.g., converting video call to voice call).

The actions taken may be to access points that are about to become congested and/or are about to receive a priority wireless device. As a priority wireless device may need to travel through one or more access points to get to a destination access point, actions may need to be taken on several access points. For example, if the priority device needs to travel through a first access point before it gets to a second access point (cannot connect directly to second access point), adjustments may need to be made to both access points. According to one embodiment, the first access point may be adjusted first followed by adjustments to the second access point. The identification of an access point being a leaf node (only transitioning wireless devices with one other access point) may be utilized in determining which access point to make adjustments to.

Figure 4:
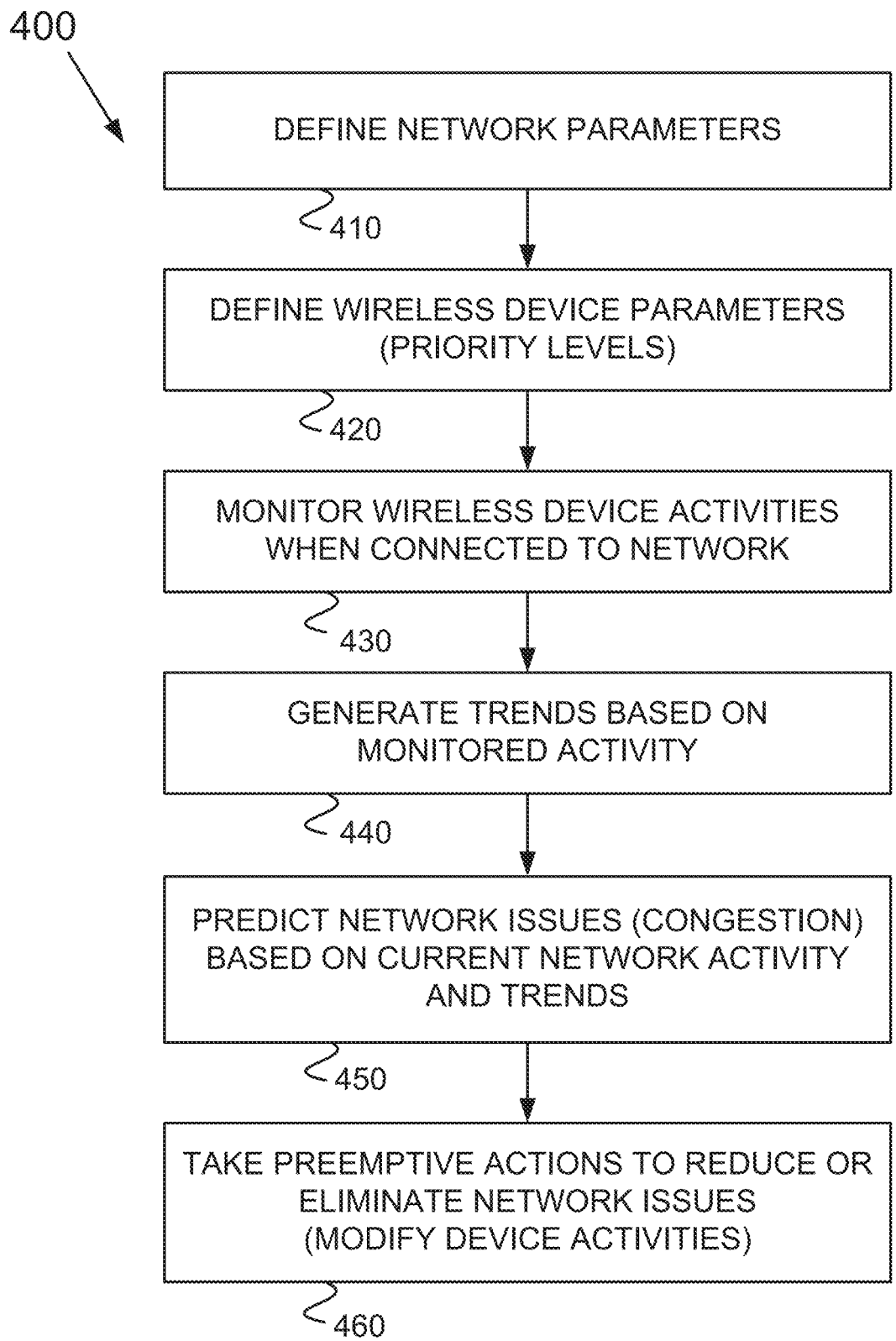
FIG. 4 illustrates an example process flow for controlling a WiFi network to limit performance issues caused by congestion, according to one embodiment.

FIG. 4 illustrates an example process flow for controlling a WiFi network to limit performance issues caused by congestion 400. Parameters about the WiFi network may be defined 410. The parameters may include, for example, a description of what access points are included and how they are connected to one another (network topology), location layout, access point connectivity (leaf node or not), and the frequency bands supported by the access points. Parameters about the wireless devices that connect to the WiFi network may be defined 420. The parameters may include, for example, priority level (e.g., high, medium, low), preferred access point, frequency bands supported, preferred frequency band, possible activities, preferred activities, bandwidth requirements, connection times, activity times and movement within the location.

The WiFi network may monitor the activities of the wireless devices connected to the network 430. The monitored activities may include, for example, wireless device connectivity (e.g., when and where wireless devices connect), wireless device activity (e.g., activities performed and times the activities are performed), bandwidth usage (e.g., amount and time), and wireless device movement (e.g., when and where wireless devices switch between access points). The monitored activity may be processed to generate trends for the wireless devices 440. The trends may include likely times that wireless device will be connected to network and which access points on the network, likely activities performed by wireless devices and times associated therewith, likely bandwidth usage and times associated therewith, likely movement patterns between access points and times associated therewith.

The trends may be applied to current network activity to predict congestion and possible performance issues with the network 450. Network topology, location layout, access point connectivity and other parameters may also be considered when predicting congestion and possible performance issues. The prediction of performance issues may flag issues with priority wireless devices. The predicted issues may include, for example, loss of bandwidth, reduction in signal strength, slower processing, drop in bit rate, reduction in service, loss of service, change in connectivity and loss of connectivity. The network may take preemptive action to reduce or eliminate the predicted issues 460. The preemptive actions may be to ensure that performance issues do not affect priority devices. The preemptive actions may be taken on non-priority devices. The preemptive actions may include, for example, routing wireless devices (e.g., non-priority devices) to other access points if the other access points are within range, changing frequency bands for wireless devices if supported, reducing the bit rate (e.g., slowly reducing the rate to limit the ability of the user to notice), reducing service (e.g., changing video call to voice call), delaying activities, restricting activities and restricting access.

The method 400 is in no way intended to be limited to the illustrated processes. Rather, additional processes can be added, processes can be combined, processes can be deleted, processes can be modified and/or the order of the processes can be modified without departing from the current scope. Computer-executable instructions (e.g., software, apps) may be stored on a computer-readable storage medium (e.g., 360). The computer-executable instructions when executed by a processor (e.g., 350) may cause the processor to perform the method 400.

Figure 5A:
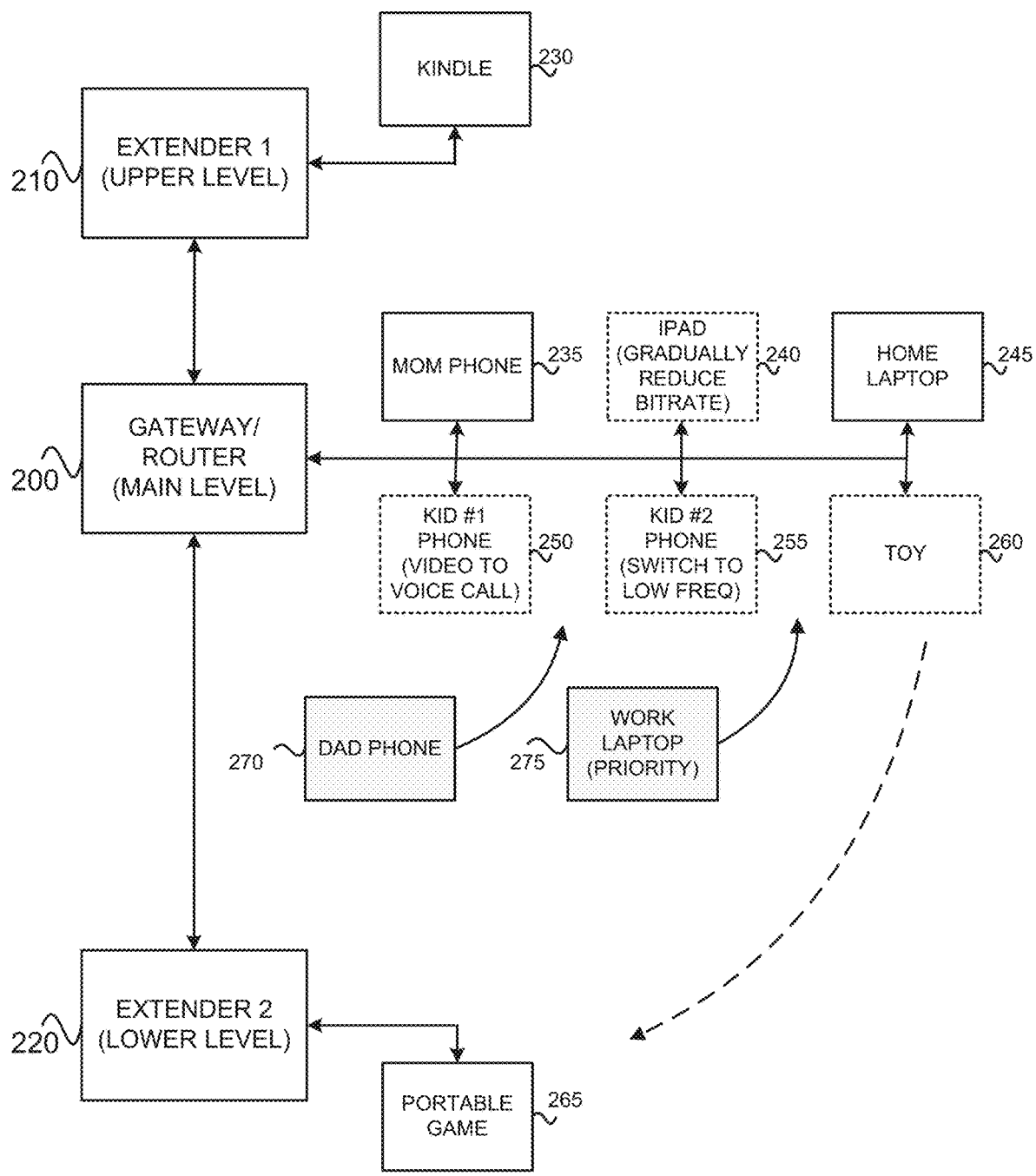
FIGS. 5A-C illustrate examples of utilizing priorities and trends to predict congestion on access points on a WiFi network and making changes to avoid, according to one embodiment.
Figure 5B:
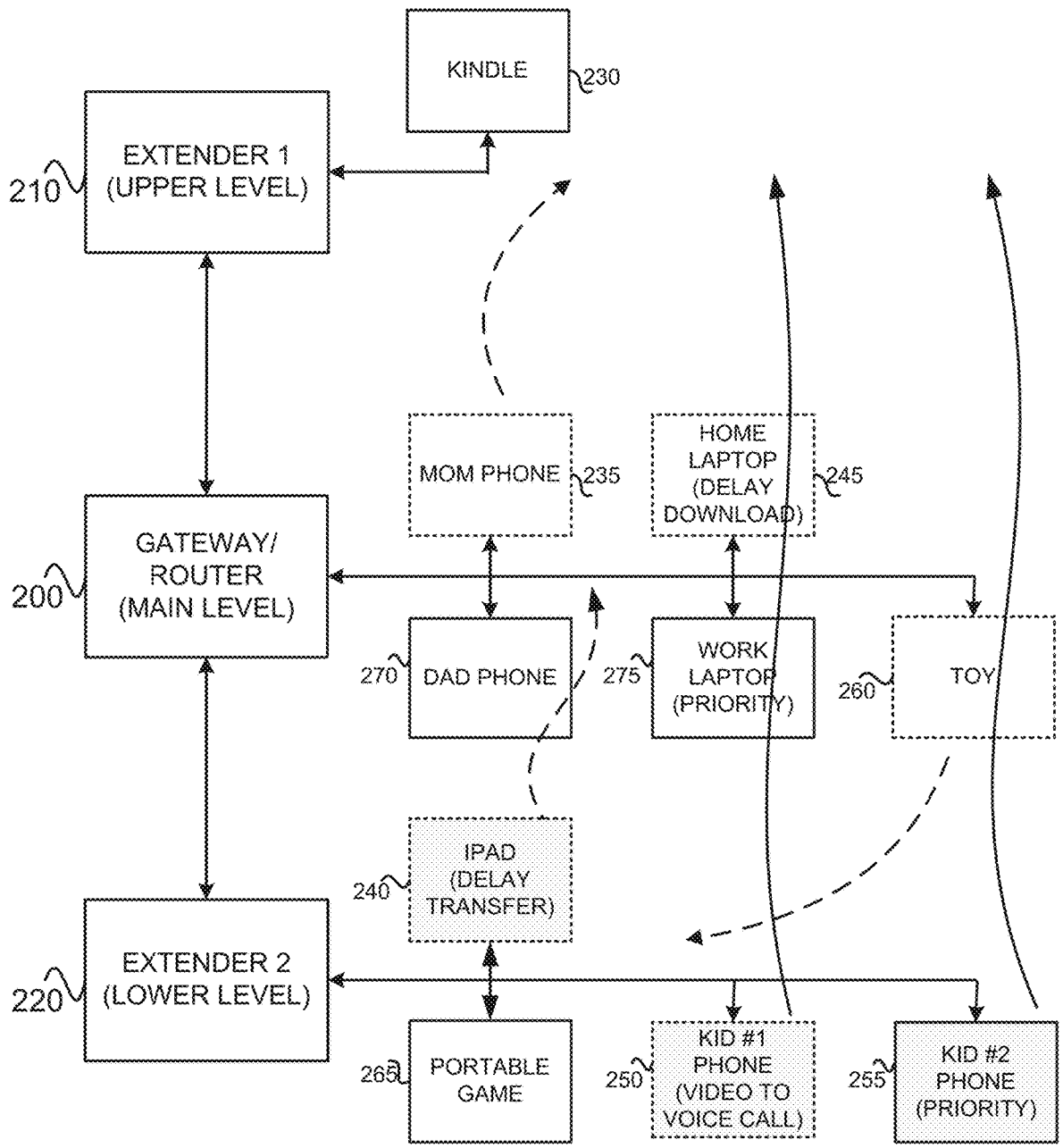
Figure 5C:
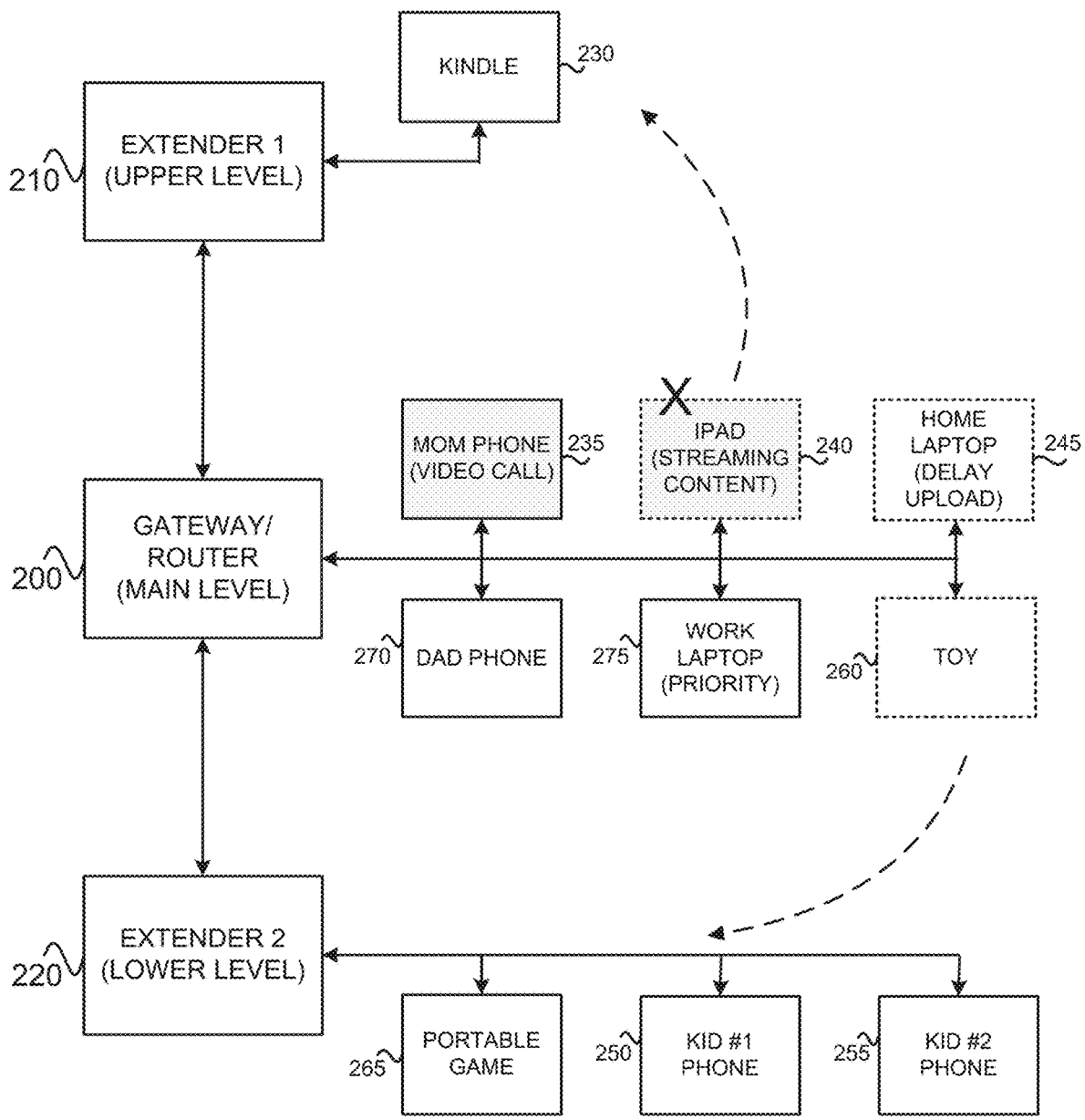

FIGS. 5A-C illustrate examples of utilizing priorities and trends to predict congestion on access points on a WiFi network and making changes to avoid. FIGS. 5A-C are the network configurations and connections of FIGS. 2A-C with adjustments made to account for the actions that are predicted to occur based on trends. FIG. 5A illustrates an example where based on captured trends, it is predicted that the dad's phone 270 and the work laptop 275 (shaded gray to indicate the prediction) will be added to the network via the gateway/router 200. The work laptop 275 is designated as a priority device. The addition of these devices 270, 275 is predicted to cause congestion for the gateway/router 200 and may cause performance issues for the devices connected thereto including the priority device 275. Accordingly, actions are taken to ensure that the work laptop 275 does not have any service issues when it attempts to connect thereto. The actions may include, for example, changing a video call to a voice call on the first kid phone 250, switching the second kid phone 255 to a different frequency band (e.g., changing from 5G to 2.4G if supported and priority device 275 requires/desires 5G), routing the toy 260 to the second extender 220 (assuming can connect thereto), and gradually reducing the bit rate of the adaptive bit rate content that is being streamed on the iPad® 240 so that the change top the quality of the video is not obvious.

FIG. 5B illustrates an example where based on trends it is predicted that the iPad® 240 is to be moved from the lower level to the main level (transition from the second network extender 220 to the gateway/router 200) and the kids phones 250, 255 are to be moved from the lower level to the upper level (transition from the second network extender 220 to first network extender 210 via the gateway/router 200). The devices 240, 250, 255 that are predicted to be moving are shaded gray. The work laptop 275 and the second kid phone 255 are designated as priority devices. The movement of the iPad® 240 and the phones 270, 275 either to, or through, the gateway/router 200 is predicted to cause congestion for the gateway/router 200 and may cause performance issues for the devices connected thereto including the priority devices 255, 275. Accordingly, actions may be taken to ensure that the work laptop 275 and the second kid phone 255 do not have any service issues during the predicted movement. The actions may include, for example, changing a video call to a voice call on the first kid phone 250 (either before or during the transition of access points), delaying the transfer of the iPad® 240 to the gateway/router 200 (assuming can still connect thereto when device moved to main level), routing the toy 260 to the second extender 220 (assuming can connect thereto), routing the mom's phone 235 to the first extender 210 (assuming can connect thereto), and delaying the downloading of material on the home laptop 245.

In this embodiment, it is predicted that when the kids phones 250, 255 continue their movement to the upper level that there are no congestion/performance issues associated with the first extender 210 so no changes are required for the second phase of the movement/transition. If there were predicted issues on the first extender 210 appropriate actions could be taken there as well. As there are no predicted congestion/performance issues, the first kid phone 250 may be changed back to a video call if it had been changed to a voice call before or during the transition from the lower level.

FIG. 5C illustrates an example where based on trends it is predicted the mom's phone 235 is going to engage in a video call and the iPad® 240 is going to start streaming content (shaded gray to indicate the prediction). The work laptop 275 is designated as a priority device. The increase in the activity on the mom's phone 235 and the iPad® 240 is predicted to cause the gateway/router 200 to become congested and may cause performance issues with the devices connected thereto including the priority device 275. Accordingly, actions may be taken to ensure that the work laptop 275 does not have any service issues during the predicted changes in activities. The actions may include, for example, routing the toy 260 to the second extender 220 (assuming can connect thereto), delaying the uploading of material on the home laptop 245 and either preventing the streaming of content on the iPad® 240 or routing the iPad® 240 to the first extender 210 (assuming can connect thereto).

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

The various embodiments are intended to be protected broadly within the spirit and scope of the appended claims.

I claim:

1. A method for using trends to predict potential issues and take actions to avoid the potential issues or limit impact thereof in a Wi-Fi wireless network, the method comprising:
    defining parameters of the Wi-Fi wireless network, the parameters including topology of the Wi-Fi wireless network and priority levels of the wireless devices for connecting to the Wi-Fi wireless network;
    monitoring activities of the wireless devices connected to the Wi-Fi wireless network;
    processing the monitored activities to develop trends for the wireless devices;
    predicting potential issues with the Wi-Fi wireless network based on current network activities and predicted activities based on the developed trends; and
    taking actions with regard to network usage by the wireless devices based on the predicted potential issues and the priority levels of the wireless devices, to avoid the potential issues or reduce impact of the potential issues on the Wi-Fi wireless network.

2. The method of claim 1, wherein the monitoring activities include monitoring at least some subset of when the wireless devices are connected to the Wi-Fi wireless network, what activities the wireless devices perform, when the activities are performed, what access points the wireless devices are connected when the activities are performed, and bandwidth utilized by the wireless devices during the activities.

3. The method of claim 2, wherein the trends include at least some subset of likely time when the wireless devices connect to the Wi-Fi wireless network and the access points associated therewith, likely activities performed by the wireless devices and times and access points associated therewith, likely bandwidth usage and times and access points associated therewith, and likely movement patterns between access points and times associated therewith.

4. The method of claim 1, wherein the predicting potential issues includes predicting congestion for an access point, wherein the congestion could result in at least some subset of bandwidth limitations, reduction in signal strength, reduction in bit rate, change in connectivity, loss of connectivity, and connectivity restrictions.

5. The method of claim 1, wherein the taking actions includes modifying the activities of one or more wireless devices.

6. The method of claim 5, wherein the modifying activities include at least some subset of restricting connectivity to prevent congestion, changing access point connectivity for one or more wireless devices that have sufficient signal strength available at other access points, limit and/or modify functions performed by one or more wireless devices connected to the access point, slowly modify bit rate for one or more wireless devices connected to the access point, changing frequency band to other frequency band for one or wireless devices that support other frequency band, delaying or restricting certain activities for one or more wireless devices and restricting access to the access point.

7. The method of claim 1, wherein the taking actions includes modifying the activities of one or more wireless devices to prevent any performance degradation to the wireless devices having the priority levels indicating high priority wireless devices.

8. The method of claim 1, further comprising identifying the parameters associated with the wireless devices that connect to the Wi-Fi wireless network.

9. The method of claim 8, wherein the identifying of the parameters includes identifying the wireless devices having the priority levels indicating high priority wireless devices.

10. A device for using trends to predict potential issues and take actions to avoid the potential issues or limit impact thereof in a Wi-Fi wireless network, the device comprising:
    a wireless interface to communicate with one or more wireless devices;
    a processor communicatively coupled to a memory for storing network configuration information, wherein the network configuration information includes network topology and wireless device parameters; and
    a computer-readable storage medium to store instructions that when executed by the processor cause the processor to:
    define parameters of the Wi-Fi wireless network, the parameters including topology of the Wi-Fi wireless network and priority levels of the wireless devices for connecting to the Wi-Fi wireless network;

monitor activities of the wireless devices connected to the Wi-Fi wireless network;

process the monitored activities to develop trends for the wireless devices;

predict potential issues with the Wi-Fi wireless network based on current network activities and predicted activities based on the developed trends; and take actions with regard to network usage by the wireless devices based on the predicted potential issues and the priority levels of the Wi-Fi wireless devices, to avoid the potential issues or reduce impact of the potential issues on the Wi-Fi wireless network.

11. The device of claim 10, wherein when the instructions are executed they cause the processor to monitor at least some subset of when the wireless devices are connected to the Wi-Fi wireless network, what activities the wireless devices perform, when the activities are performed, what access points the wireless devices are connected when the activities are performed, and bandwidth utilized by the wireless devices during the activities.

12. The device of claim 11, wherein when the instructions are executed they cause the processor to identify trends including at least some subset of likely time when the wireless devices connect to the Wi-Fi wireless network and the access points associated therewith, likely activities performed by the wireless devices and times and access points associated therewith, likely bandwidth usage and times and access points associated therewith, and likely movement patterns between access points and times associated therewith.

13. The device of claim 10, wherein when the instructions are executed they cause the processor to predict congestion for an access point, wherein the congestion could result in at least some subset of bandwidth limitations, reduction in signal strength, reduction in bit rate, change in connectivity, loss of connectivity, and connectivity restrictions.

14. The device of claim 10, wherein when the instructions are executed they cause the processor to modify the activities of one or more wireless devices to avoid the potential issues or reduce impact of the potential issues.

15. The device of claim 10, wherein when the instructions are executed they cause the processor to modify the activities of one or more wireless devices to prevent any performance degradation to the wireless devices having the priority levels indicating high priority wireless devices.

16. A non-transitory computer-readable storage medium containing stored instructions that when executed by a processor cause the processor to use trends to predict potential issues and take actions to avoid the potential issues or limit impact thereof in a Wi-Fi wireless network by:

defining parameters of the Wi-Fi wireless network, the parameters including topology of the Wi-Fi wireless network and priority levels of the wireless devices for connecting to the Wi-Fi wireless network;

monitoring activities of the wireless devices connected to the Wi-Fi wireless network;

processing the monitored activities to develop trends for the wireless devices;

predicting potential issues with the Wi-Fi wireless network based on current network activities and predicted activities based on the developed trends; and taking actions with regard to network usage by the wireless devices based on the predicted potential issues and the priority levels of the wireless devices, to avoid the potential issues or reduce impact of the potential issues on the Wi-Fi wireless network.

17. The non-transitory computer-readable storage medium of claim 16, wherein when the instructions are executed they cause the processor to monitor at least some subset of when the wireless devices are connected to the Wi-Fi wireless network, what activities the wireless devices perform, when the activities are performed, what access points the wireless devices are connected when the activities are performed, and bandwidth utilized by the wireless devices during the activities; and identify trends including at least some subset of likely time when the wireless devices connect to the Wi-Fi wireless network and the access points associated therewith, likely activities performed by the wireless devices and times and access points associated therewith, likely bandwidth usage and times and access points associated therewith, and likely movement patterns between access points and times associated therewith.

18. The non-transitory computer-readable storage medium of claim 16, wherein when the instructions are executed they cause the processor to predict congestion for an access point, wherein the congestion could result in at least some subset of bandwidth limitations, reduction in signal strength, reduction in bit rate, change in connectivity, loss of connectivity, and connectivity restrictions.

19. The non-transitory computer-readable storage medium of claim 16, wherein when the instructions are executed they cause the processor to modify the activities of one or more wireless devices to avoid the potential issues or reduce impact of the potential issues.

20. The non-transitory computer-readable storage medium of claim 16, wherein when the instructions are executed they cause the processor to modify the activities of one or more wireless devices to prevent any performance degradation to the wireless devices having the priority levels indicating high priority wireless devices.

* * * * *